(12) United States Patent
Alhilo

(10) Patent No.: US 8,190,296 B2  
(45) Date of Patent: May 29, 2012

(54) APPARATUS AND METHOD FOR CONTROL OF A THERMOSTAT

(75) Inventor: Esan A. Alhilo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 652 days.

(21) Appl. No.: 12/268,898

(22) Filed: Nov. 11, 2008

(65) Prior Publication Data
US 2009/0062965 A1  Mar. 5, 2009

(51) Int. Cl.
- G05B 15/00 (2006.01)
- F24F 7/00 (2006.01)
- G05D 23/00 (2006.01)

(52) U.S. Cl. ............... 700/278; 236/49.3; 236/1 B
(58) Field of Classification Search ............ None
See application file for complete search history.

(56) References Cited

U.S. PATENT DOCUMENTS

| | | | |
|---|---|---|---|
| 4,753,388 A * | 6/1988 | Rummage | 236/46 R |
| 4,817,705 A * | 4/1989 | Levine et al. | 165/243 |
| 5,456,407 A * | 10/1995 | Stalsberg et al. | 236/46 R |
| 6,032,867 A | 3/2000 | Dushane et al. | 236/51 |
| 7,109,444 B2 * | 9/2006 | Levy et al. | 219/492 |

* cited by examiner

Primary Examiner — Kakali Chaki  
Assistant Examiner — Walter Hanchak  
(74) Attorney, Agent, or Firm — Harness, Dickey & Pierce, P.L.C.

(57) ABSTRACT

A thermostat is provided that includes a temperature sensor for sensing ambient temperature, and a switching device that is configured to apply electrical power to a heating element when the switching device is activated. The thermostat further includes a processor that is configured to periodically determine for a finite switching time period a temperature delta value indicative of the difference between the sensed temperature and a desired set point temperature. The processor is further configured to calculate a duty cycle ratio of the switch activation time relative to the total switching time period. The calculated duty cycle ratio for determining the switch activation time is determined as a function of the temperature delta value, a duty cycle offset and a heat dissipation offset. The duty cycle offset and the heat dissipation offset are based on an average of a predetermined number of prior duty cycle ratios.

19 Claims, 3 Drawing Sheets

APPARATUS AND METHOD FOR CONTROL OF A THERMOSTAT

FIELD

The present disclosure relates to thermostats, and more particularly to temperature sensors within digital thermostats for controlling HVAC systems.

BACKGROUND

The statements in this section merely provide background information related to the present disclosure and may not constitute prior art.

Heating systems that use line voltages of 120 volts or 240 volts are typically switched on or off by a thermostat. Such thermostats may employ electromechanical relays or solid state switches to switch line voltage to the heating element or load. While electromechanical relays offer the advantage of switching with minimum power dissipation when the relay is on, solid state switching devices have the disadvantage that they typically include a voltage drop that results in heat dissipation, where the heat dissipated can adversely affect the thermostat's temperature sensing element. This increased temperature in the sensing element affects the sensor's ability to accurately sense the rise in ambient temperature, and causes the thermostat switch to open and turn off the heating unit before the ambient temperature increases sufficiently to the desired temperature. Such inaccuracy in control could cause the ambient temperature swings within the control space to become excessive because of the sensor differential caused by heat dissipated by the switch.

SUMMARY

Various embodiments are provided of an improved thermostat having a control algorithm for controlling the application of electrical power to a resistive heating element. In one embodiment of an improved thermostat for controlling the application of electrical power to a heating element for controlling ambient temperature within a space, the improved thermostat includes a temperature sensor within the thermostat. The temperature sensor is configured to communicate a value indicative of the ambient temperature in the space to be heated. The thermostat further includes a switching device that is configured to apply electrical power to a heating element when the switching device is activated. A heat sink associated with the switch is provided, which is configured to dissipate heat generated by the switching device. The thermostat further includes a processor, configured to periodically determine, for a finite switching time period, a temperature delta value indicative of the difference between the sensed temperature and a desired set point temperature. The processor is further configured to calculate a duty cycle ratio of the switch activation time relative to the total switching time period. The duty cycle ratio for determining the switch activation time is determined as a function of the temperature delta value, a duty cycle offset and a heat dissipation offset. The duty cycle offset, and the heat dissipation offset are based on an average of a predetermined number of prior duty cycle ratios. The processor is further configured to activate the switch for the calculated ratio of the total switching period, to thereby control the extent of electrical power applied to the heating element.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
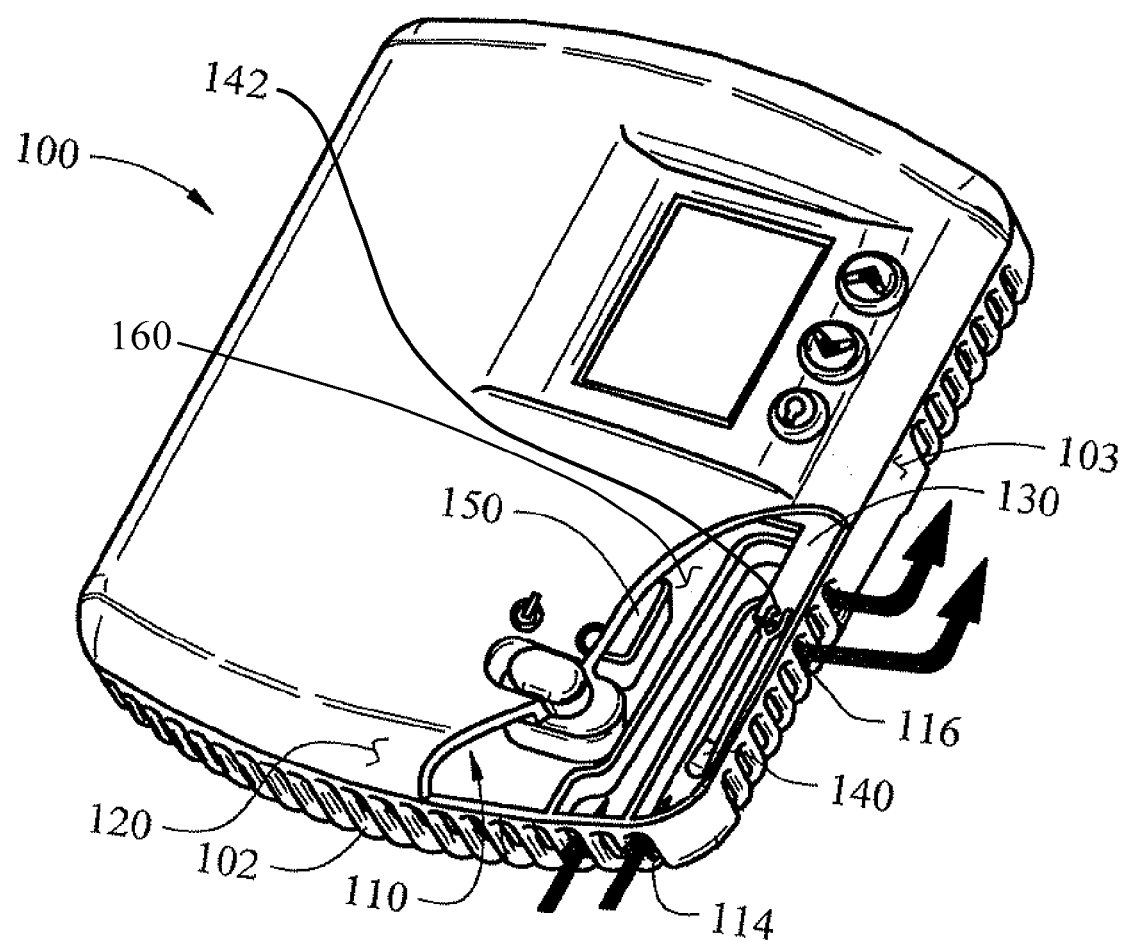
FIG. 1 shows one embodiment of a thermostat having a temperature sensing device within a compartment in accordance with the present invention.

The following description is merely exemplary in nature and is not intended to limit the present disclosure, application, or uses. It should be understood that throughout the drawings, corresponding reference numerals indicate like or corresponding parts and features.

Referring to FIG. 1, a first embodiment of an improved thermostat 100 is shown that includes a temperature sensing element inside the thermostat. The thermostat includes a base portion 102 and a cover portion 120 that mate to form a housing that includes a circuit board, as shown in FIG. 1. The thermostat 100 includes an interior space 110, in which a temperature sensor 104 is positioned along a side wall 103 of the thermostat 100. The thermostat 100 further includes a first aperture 114 in the thermostat near the lower portion of the thermostat. This first aperture 114 permits communication of airflow in a lower portion of the interior space 110 of the thermostat. The thermostat 100 includes a second aperture 116 disposed in the thermostat above the first lower aperture 114, where the second upper aperture 116 permits communication of airflow from within the interior space 110 of the thermostat 100.

A temperature sensing element 140 is provided within the interior space 110 of the thermostat 100, which includes electrical leads 142 extending to a circuit board 130. The thermostat 100 may include electrical components that generate heat, such as a switch device configured to switch a line voltage source to a load. For example, the switch may be a Field Effect Transistor (FET), Triac device, or other solid-state type of switching device. The thermostat 100 may further include a heat sink 160 associated with the switch, where the heat sink 160 is disposed within a portion of the interior space of the thermostat. The air heated by the switch or heat sink 160 rises upward and escapes through aperture 116 or vents in the top of the thermostat 100. This heated air escaping the thermostat 100 housing creates a chimney effect that draws ambient air in through vent aperture 114 in the bottom of the thermostat 100. The heated air rising through the thermostat 100 creates an upward draft of airflow, which has the effect of pulling heat out of the interior of the thermostat 100. The heat generated by the switch, and dissipated by the heat sink 160, can negatively affect the ability of the temperature sensing element 140 to accurately sense the ambient temperature in the space. A second temperature sensing element adjacent the heat sink 160 could be used for sensing the temperature of the heat sink 160, which could be used for offsetting the ambient temperature sensed by temperature sensing element 140. However, this approach would entail added complexity and cost associated with the second sensor.

The present thermostat 100 includes an improved means of controlling the application of electrical power to a heating element for controlling the ambient temperature within a space. The thermostat 100 comprises a single temperature sensing element 140 that is configured to communicate a value indicative of the ambient temperature in the space to be heated. The thermostat 100 includes a switching device 150 configured to apply electrical power to a heating element when the switching device 150 is activated. A heat sink 160 is associated with the switch, and is configured to dissipate heat generated by the switching device 150.

The thermostat 100 further includes a processor that is configured to periodically determine a temperature delta value indicative of the difference between the sensed ambient temperature and a desired set point temperature. The processor is also configured to calculate a percentage of a finite switching time period (e.g. -between 15 and 30 seconds, for example) for activating the switch. The processor then activates the switch for the determined percentage for the finite switching time period, to thereby control the extent of electrical power applied to the heating element. More specifically, the processor is configured to calculate the percentage based on the temperature delta value and at least a heat dissipation offset that is determined based on an average of a predetermined number of prior switching percentages.

The thermostat 100 is configured to control the switch device 150 to control how long electrical power is switched to the heating load in a given switching time period, to thereby supply only the power required by the heating load to maintain the desired temperature. The determination of the percentage of the switching time period for activating the switch is sometimes called a duty-cycle. The percentage or duty-cycle is determined based on the difference between the latest buffered temperature reading and the desired set point. This essentially is the difference between the Set-Point Temperature and the Ambient Temperature, or SPT-AT. The percentage or duty-cycle is also determined based on a heat sink offset, which may also be called a temperature compensation drift offset.

In the first embodiment, the controller is configured to determine the extent of time that power is to be switched to a heating load for a given switching time period, to maintain the ambient temperature within 2 degrees Celsius of the set point temperature. In the first embodiment, the switching time period is approximately 20 seconds. The controller is configured to measure the ambient temperature once every 6 seconds. The sensed ambient temperature, which may be at some fractional amount between integer values (e.g., 23.66 degrees Celsius) is then matched to or assigned a thermostat buffered temperature. The difference between the set point temperature and the ambient temperature sensed by element 140 is called the SPT-AT temperature delta, where the SPT-AT temperature delta value is the difference between the temperature set point and the thermostat buffered temperature. This temperature delta value is assigned a value, in increments of 5, of between 0 and 200. Specifically, the controller assigns an incremental temperature value for up to 20 counts of one degree Celsius (1 degree Celsius=100 counts). Thus, the difference or SPT-AT temperature delta value, is expressed as a value between 0 and 200 corresponding to a temperature difference between 0 and 2 degrees Celsius. The thermostat controller then calculates the duty cycle that determines the percentage of the time period that power is to be applied to the heating load, such as an electric baseboard heater, depending on the SPT-AT temperature delta value. The minimum SPT-AT delta is zero. The maximum SPT-AT delta is 200 counts (2 degrees Celsius). If the ambient temperature does differ from the set point temperature by more than 2 degrees Celsius (such as when the thermostat is first activated), the SPT-AT delta value will be assigned a maximum value of 200 counts (2 degrees Celsius). The thermostat controller will update the duty cycle calculation once every 20 seconds. Finally, the thermostat controller converts the calculated duty cycle to a firing rate signal, which is used to regulate the electronic controller. The firing rate signal duration is the ON time in seconds that the thermostat controller operates or activates the switch device. An example of this determination of a duty cycle determination is shown below. The determination of a firing rate (or percentage of the switching time period) is illustrated by the data in TABLE 1 shown below. For example, if the calculated SPT-AT temperature delta value is 1 degree (or 100 counts) then the duty cycle is 50% and the firing rate duration is 10 seconds, where the controller turns the heating system ON for 10 seconds and OFF for 10 seconds.

TABLE 1

| SPT-AT delta | Duty cycle | Firing rate |
| --- | --- | --- |
| 0 | 0% | 0 |
| 10 | 5% | 1 |
| 20 | 10% | 2 |
| 30 | 15% | 3 |
| 40 | 20% | 4 |
| 50 | 25% | 5 |
| 60 | 30% | 6 |
| 70 | 35% | 7 |
| 80 | 40% | 8 |
| 90 | 45% | 9 |
| 100 | 50% | 10 |
| 110 | 55% | 11 |
| 120 | 60% | 12 |
| 130 | 65% | 13 |
| 140 | 70% | 14 |
| 150 | 75% | 15 |
| 160 | 80% | 16 |
| 170 | 85% | 17 |
| 180 | 90% | 18 |
| 190 | 95% | 19 |
| 200 | 100% | 20 |

To maintain an optimized heating system performance that achieves a precise desired temperature set point, the thermostat controller is configured to compensate for the temperature drift due to heat dissipation by the heat sink that raises the temperature inside the thermostat, which dissipation is based on the percentage or duty cycle that the switch is being operated at. Specifically, the heat sink of the thermostat may dissipate heat depending on heat system current and the duty cycle. The greater the percentage the longer the time that the switch device is activated and applying electrical power, which in turn generates more heat. The heat sink dissipation raises the temperature inside the thermostat, and causes a drift in the temperature measurement. Thus, the thermostat determines a heat dissipation offset as a function of the percentage of time or duty-cycle at which the switch device has historically been activated, such that the offset is based on the heating system's past performance.

Specifically, the heat dissipation offset is determined based on an average of a predetermined number of duty cycle values for prior finite time intervals. The thermostat controller keeps a log of the heating percentage or duty cycle data for each finite time period, storing the duty cycle data once every 20 second interval for a time period of up to about an hour. The duty cycle data for prior finite time intervals over the past hour are summed and averaged to determine an average duty cycle value. The average duty cycle value is utilized to generate the thermostat controller's heat sink offset value, or heat dissipation offset. This offset will be added to the SPT-AT delta to calculate the duty cycle percentage and firing rate for each subsequent finite interval over the next hour. The heat dissipation value depends on the amount of heat that the heat sink dissipates, which depends on the current that is being drawn by the heating load. Since the temperature sensing element 140 is affected by the amount of heat dissipated by the heat sink in the thermostat, controlling the heating system to accurately maintain temperature is critically dependent on the amount of current being drawn. Accordingly, the thermostat may be configured to permit a user to select the current level setting, or may employ a sensor to detect the level of current draw. Where a low current heating load (500-2000 watts) is selected and may draw a current of only 4 amps, the algorithm uses a first equation or look-up table to determine a "light" heat sink offset value. If a high current heating load (2000-4000 watts) is selected, which may draw a current of 12 amps or more, the algorithm uses a second equation or look-up table to determine a "heavy" heat sink offset value. The thermostat calculates either a Light current Heat sink offset or a heavy current heat sink offset. The light current Heat sink offset=(firing rate×10)+15, and the Heavy current Heat sink offset=(((firing rate×10)+15)×2)+70+firing rate. Table 2 shows heat dissipation offset values for a light current load (4 Amp) and heavy current load (12 Amp).

TABLE 2

| Duty cycle | Firing rate | Light HS Offset | Heavy HS Offset |
|---|---|---|---|
| 0% | 0 | 15 | 100 |
| 5% | 1 | 25 | 121 |
| 10% | 2 | 35 | 142 |
| 15% | 3 | 45 | 163 |
| 20% | 4 | 55 | 184 |
| 25% | 5 | 65 | 205 |
| 30% | 6 | 75 | 226 |
| 35% | 7 | 85 | 247 |
| 40% | 8 | 95 | 268 |
| 45% | 9 | 105 | 289 |
| 50% | 10 | 115 | 310 |
| 55% | 11 | 125 | 331 |
| 60% | 12 | 135 | 352 |
| 65% | 13 | 145 | 373 |
| 70% | 14 | 155 | 394 |
| 75% | 15 | 165 | 415 |
| 80% | 16 | 175 | 436 |
| 85% | 17 | 185 | 457 |
| 90% | 18 | 195 | 478 |
| 95% | 19 | 205 | 499 |
| 100% | 20 | 215 | 520 |

The controller is preferably a proportional-integral-derivative (PID) controller, which will preferably maintain a duty cycle based on the SPT-AT delta, which will lead to keeping the room temperature below the desired set point. For example, if the duty cycle is 50%, the PID controller will preferably maintain a temperature of 1 degree Celsius below the desired set point. This offset is designed to help the heating system achieve the user's desired temperature with respect to the running heating duty cycle. The controller accordingly uses an algorithm to determine the percentage or duty-cycle of on-time of power to a heating load during a finite interval, based on a calculation that is a function of the difference between the Set-Point Temperature (SPT) and sensed Ambient Temperature (AT), plus a duty cycle offset that is an averaged duty cycle value multiplied by a duty cycle mulitplier multiplier (e.g.- 2), plus a second heat sink factor (e.g. 8, for example), the sum of which is multiplied by a current multiplier (e.g. 4).

Figure 2:
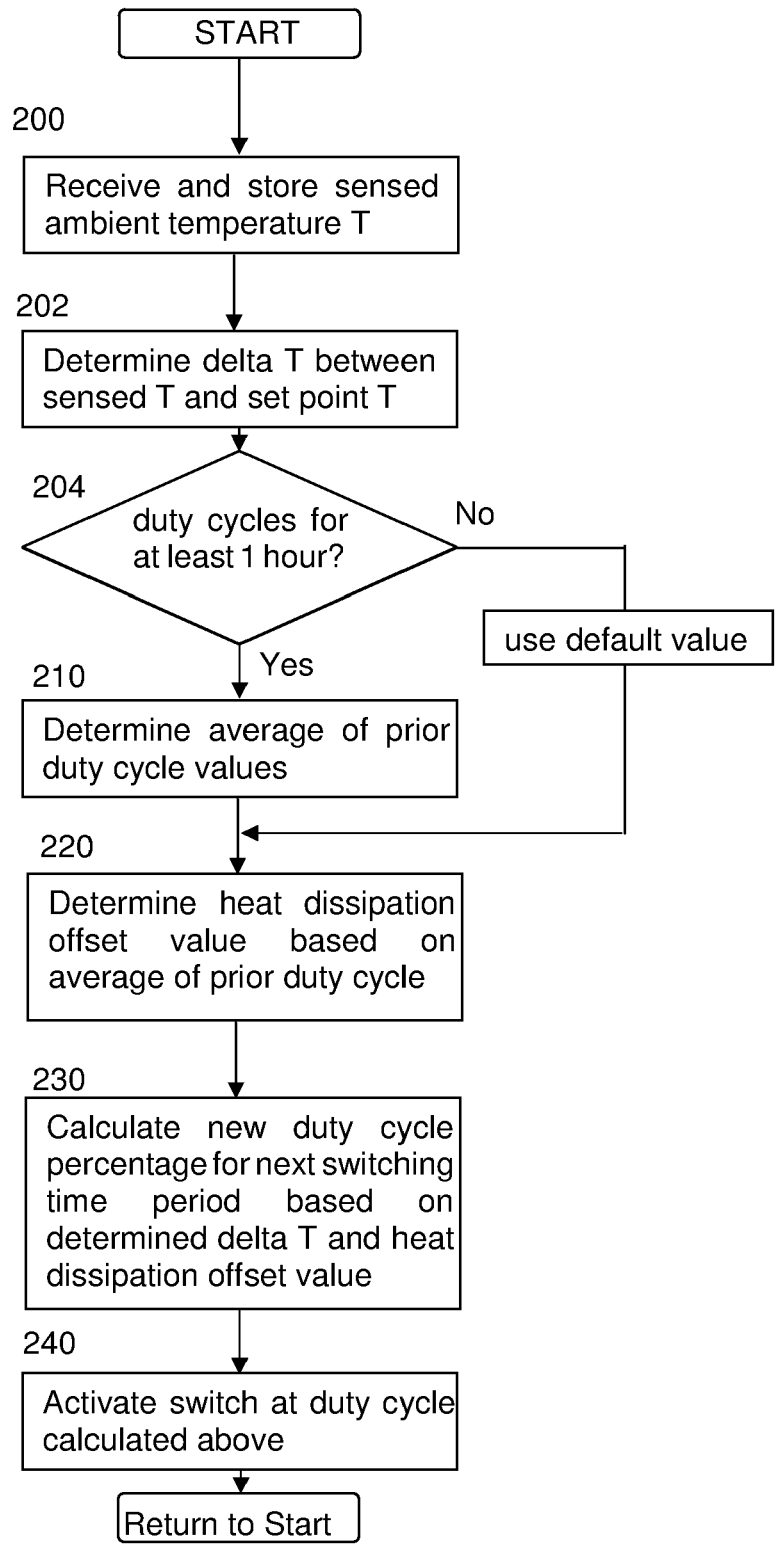
FIG. 2 shows one embodiment of a flow chart for controlling a thermostat having a temperature sensor in accordance with the present invention.

Referring to FIG. 2, one embodiment of a method for controlling the application of power by a thermostat to a heating load is shown in a flow chart. The method first determines a temperature delta value indicative of the difference between the sensed temperature and a desired set point temperature at step 202. At step 210, the method then determines the average of a number of prior duty cycle values (or switching percentages), where such prior duty cycle values exist. If there are not a sufficient number of prior duty cycle values, a default value is used in place of the determined average. The method then determines at step 220 a heat dissipation offset value that is based on the average of prior determined duty cycle switching percentages. From the preceding values determined in the above steps, the method proceeds at step 230 to calculate a duty cycle percentage for a finite switching time period in which the switch is to be activated, based on the temperature delta offset value, and a heat dissipation offset value (which is a function of or based on the average of prior calculated switching percentages). Once the method has calculated a duty cycle switching percentage of the finite time period in which to activate the switch, the method then calls for activating the switch for the determined percentage of the switching time period at step 240. The activation of the switch for only a percentage of a total switching time period limits the extent of electrical power that is applied to a heating element or load, to thereby control the amount of heat that is being generated by the heating element or load. Using the above method for determining and adjusting the percentage of time in which a switch is activated to apply power to a heating element, a thermostat is capable of more effectively controlling the heat source to more accurately control the temperature within the space being heated so as not to overshoot the set point, and thereby provide more energy-efficient heating.

In a second embodiment, the thermostat may be configured to determine how long electrical power is switched to a heating load in a finite switching time period of about 20 seconds, to regulate within a shorter interval the power required to maintain the desired temperature. The controller is configured to measure the ambient temperature once every 6 seconds. The sensed ambient temperature, which may be at some fractional amount between integer values, is matched to or assigned a buffered temperature value, as an incremental temperature value for up to 20 counts of one degree Celsius (1 degree Celsius=100 counts). The difference between the set point temperature and the ambient temperature sensed by element 140 is called the SPT-AT temperature delta, where the SPT-AT temperature delta value is the difference between the temperature set point and the thermostat buffered temperature. This temperature delta value is assigned a value, in increments of 5, of between 0 and 200.

Specifically, the controller assigns an incremental temperature value for up to 20 counts of one degree Celsius (1 degree Celsius=100 counts). Thus, the SPT-AT temperature delta value is expressed as a value between 0 and 200 corresponding to a temperature difference between 0 and 2 degrees Celsius. The thermostat controller then calculates a duty cycle that represents the percentage of the finite time period that power is to be applied to the heating load, such as an electric baseboard heater, based in part on the SPT-AT temperature delta value. The minimum SPT-AT delta is zero. The maximum SPT-AT delta is 200 counts (2 degrees Celsius). If the ambient temperature does differ from the set point temperature by more than 2 degrees Celsius (such as when the thermostat is first activated), the SPT-AT delta value will be assigned a maximum value of 200 counts (2 degrees Celsius). The thermostat controller will determine a duty cycle calculation once every finite time period, or every 20 seconds. The thermostat controller converts the calculated duty cycle to a firing rate signal, which is used to regulate the electronic controller. The firing rate signal duration is the ON time in seconds that the thermostat controller operates or activates the switch device, to power the heating load during a portion of the finite time period. The controller employs an algorithm to determine the firing rate for each finite time interval.

In the second embodiment, the first step of the algorithm is to calculate a new SPT-AT delta value at the end of a 20 second time interval. The algorithm's next step is to calculate a duty cycle value for the next 20 second time interval. The next time interval duty cycle value is equal to the set point temperature expressed as a value between 0 and 200 corresponding to a temperature delta between 0 and 2 degrees Celsius, plus a duty cycle offset value and a heat sink offset value. The duty cycle offset value and heat sink offset value are values that are recalculated every hour, and are used in calculating the duty cycle for each 20 second interval in the following hour.

The determination of a firing rate (or percentage of the switching time period) is illustrated by the data in TABLE 3 shown below. The algorithm also determines firing rate, which is reflective of calculated duty cycle value for the next time interval. For example, if the calculated SPT-AT temperature delta value is 1 degree (or 100 counts) then the duty cycle is 50% and the firing rate duration is 10 seconds. This means that the electronic controller will turn the heating system ON for 10 seconds and OFF for 10 seconds repeatedly.

TABLE 3

| SPT-AT delta | Duty cycle | Firing rate |
| --- | --- | --- |
| 0 | 0% | 0 |
| 10 | 5% | 1 |
| 20 | 10% | 2 |
| 30 | 15% | 3 |
| 40 | 20% | 4 |
| 50 | 25% | 5 |
| 60 | 30% | 6 |
| 70 | 35% | 7 |
| 80 | 40% | 8 |
| 90 | 45% | 9 |
| 100 | 50% | 10 |
| 110 | 55% | 11 |
| 120 | 60% | 12 |
| 130 | 65% | 13 |
| 140 | 70% | 14 |
| 150 | 75% | 15 |
| 160 | 80% | 16 |
| 170 | 85% | 17 |
| 180 | 90% | 18 |
| 190 | 95% | 19 |
| 200 | 100% | 20 |

The method used by the algorithm also stores historical duty cycle values, by storing or summing each duty cycle value determined for each 20 second interval. Initial duty cycle default value is 50%. Based on the initial duty cycle value of 50%, the algorithm determines a duty cycle offset value. Every hour, the number of stored duty cycle calculations over the last hour are averaged, to determine a new average duty cycle over the past hour. This new average duty cycle is multiplied by a duty cycle factor or multiplier (e.g. 10) to calculate a new duty cycle offset value as shown in Table 4 below.

TABLE 4

| Duty cycle | Firing rate | Duty Cycle Offset |
| --- | --- | --- |
| 0% | 0 | 0 |
| 5% | 1 | 10 |
| 10% | 2 | 20 |
| 15% | 3 | 30 |
| 20% | 4 | 40 |
| 25% | 5 | 50 |
| 30% | 6 | 60 |
| 35% | 7 | 70 |
| 40% | 8 | 80 |
| 45% | 9 | 90 |
| 50% | 10 | 100 |
| 55% | 11 | 110 |
| 60% | 12 | 120 |
| 65% | 13 | 130 |
| 70% | 14 | 140 |
| 75% | 15 | 150 |
| 80% | 16 | 160 |
| 85% | 17 | 170 |
| 90% | 18 | 180 |
| 95% | 19 | 190 |
| 100% | 20 | 200 |

To maintain an optimized heating system performance that achieves a precise desired temperature set point, the thermostat controller is configured to compensate for the temperature drift due to heat dissipation by the heat sink raising the temperature inside the thermostat, which dissipation is based on the percentage or duty cycle that the switch is being operated at. Specifically, the heat sink of the thermostat may dissipate heat depending on heat system current and the duty cycle. The greater the percentage the longer the time that the switch device is activated and applying electrical power, which in turn generates more heat. The heat sink dissipation raises the temperature inside the thermostat, and causes a drift in the temperature measurement. Accordingly, the thermostat controller determines a heat dissipation offset as a function of the percentage of time or duty-cycle at which the switch device is activated, where the offset is based on the heating system's past performance. More specifically, the heat dissipation offset is determined based on an average of a predetermined number of prior switching percentages. The thermostat controller keeps a log of the heating percentage or duty cycle data, storing the percentage data once every 20 seconds for the past hour. Those heating duty cycle data are averaged and utilized to generate the thermostat controller's heat dissipation offset. This offset will be added to the SPT-AT delta to calculate the duty cycle and the firing rate.

Specifically, the algorithm selects either a light current heat sink offset or a heavy current heat sink offset. The thermostat may be configured to permit a user to select the current level setting, or may employ a sensor to detect the level of current draw. In selecting a low current heating load (500-2000 watts) that may draw a current of only 4 amps, the light current heat sink offset is calculated as the new duty cycle offset plus a first heat sink factor (e.g. 15, for example). Where a high current heating load (2000-4000 watts) is selected, the heavy current heat sink offset is determined based on whether the duty cycle was less than 50% or greater than 50%. Where the duty cycle is less than 50%, the heavy current heat sink offset is equal to the new duty cycle offset plus a second heat sink factor (e.g. 8, for example), the sum of which is multiplied by a heavy current multiplier (e.g. 4, for example). Where the duty cycle is greater than 50%, the heavy current heat sink offset is equal to the new duty cycle offset plus a third heat sink factor (e.g. 7, for example), the sum of which is multiplied by a heavy current multiplier (e.g. 4, for example). The heat sink offset value and duty cycle offset value are then stored, and both the stored heat sink offset and duty cycle offset values are used in subsequent duty cycle calculations for finite time intervals over the next hour. An example of heat dissipation offset values are shown in Table 5 below, which includes heat sink offsets for light current (4 Amp) and heavy current (16 Amp).

TABLE 5

| Duty cycle | Firing rate | Light HS Offset | Heavy HS Offset |
|---|---|---|---|
| 0% | 0 | 15 | 32 |
| 5% | 1 | 25 | 72 |
| 10% | 2 | 35 | 112 |
| 15% | 3 | 45 | 152 |
| 20% | 4 | 55 | 192 |
| 25% | 5 | 65 | 232 |
| 30% | 6 | 75 | 272 |
| 35% | 7 | 85 | 312 |
| 40% | 8 | 95 | 352 |
| 45% | 9 | 105 | 392 |
| 50% | 10 | 115 | 428 |
| 55% | 11 | 125 | 468 |
| 60% | 12 | 135 | 508 |
| 65% | 13 | 145 | 548 |
| 70% | 14 | 155 | 588 |
| 75% | 15 | 165 | 628 |
| 80% | 16 | 175 | 668 |
| 85% | 17 | 185 | 708 |
| 90% | 18 | 195 | 748 |
| 95% | 19 | 205 | 788 |
| 100% | 20 | 215 | 828 |

The PID controller will preferably maintain a duty cycle based on the SPT-AT delta, which will lead to keeping the room temperature below the desired set point. For example, if the duty cycle is 50%, the PID controller will preferably maintain a temperature of 1 degree Celsius below the desired set point. This offset is designed to help the heating system achieve the user's desired temperature with respect to the running heating duty cycle. The controller accordingly uses an algorithm to determine the percentage or duty-cycle of on-time of power to a heating load during a finite interval, based on a calculation that is a function of the difference between the Set-Point Temperature (SPT) and sensed Ambient Temperature, (AT), plus a duty cycle offset that is an averaged duty cycle value multiplied by a duty cycle multiplier (e.g.- 2, for example), plus a second heat sink factor (e.g. 4 to 8, for example), the sum of which is multiplied by a current multiplier (e.g. 1 to 4).

Figure 3:
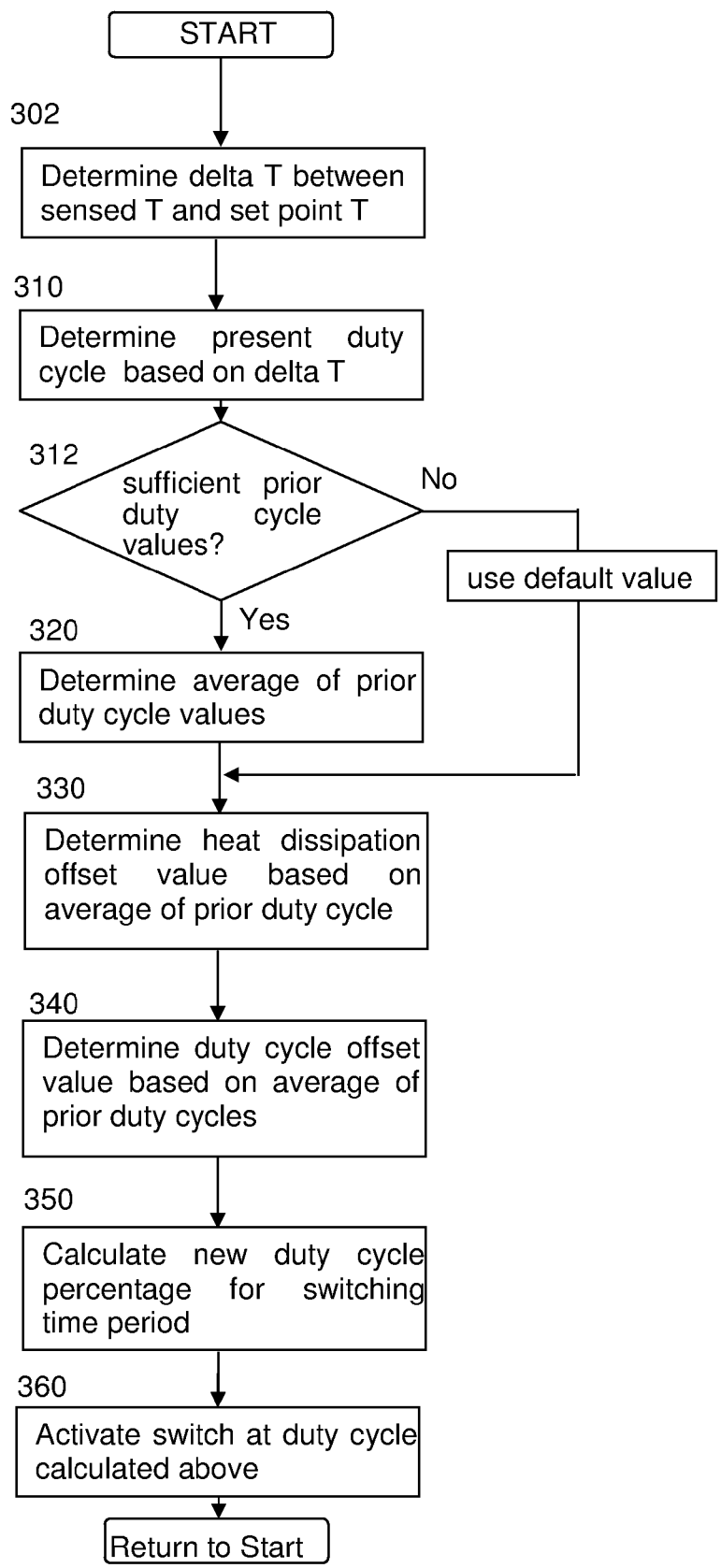
FIG. 3 shows a second embodiment of a flow chart for controlling a thermostat having a temperature sensor in accordance with the present invention.

Referring to FIG. 3, a second embodiment of a method for controlling the application of power by a thermostat to a heating load is shown in a flow chart. In the second embodiment, the thermostat comprises a temperature sensor configured to communicate a value indicative of the ambient temperature in the space to be heated, and a switching device configured to apply electrical power to a heating element when the switching device is activated. The thermostat further comprises a heat sink associated with the switch, which is configured to dissipate heat generated by the switching device; and a processor for controlling the switching device. The processor is configured to determine, for a finite switching time period, a temperature delta value indicative of the difference between the sensed temperature and a desired set point temperature, and configured to determine a percentage of the switching time period that the switch is activated, based on the temperature delta value and a heat dissipation offset that is a function of an average of a predetermined number of prior switching percentages. The processor is further configured to activate the switch for the determined percentage of the switching time period, to thereby control the extent of electrical power applied to the heating element, wherein the heat dissipation offset value varies proportionally with respect to the averaged switching percentages.

In the second embodiment of a method for controlling the application of power by a thermostat, the thermostat comprises a temperature sensor configured to communicate a value indicative of the ambient temperature in the space to be heated, and a switching device configured to apply electrical power to a heating element when the switching device is activated. The thermostat further includes a heat sink associated with the switch, which is configured to dissipate heat generated by the switching device, and a processor. The processor is configured to periodically determine, for a finite switching time period, a temperature delta value indicative of the difference between the sensed temperature and a desired set point temperature. In accordance with the flow chart shown in FIG. 3, the processor is further configured to calculate a ratio of a switch activation time to the total switching time period as a function of the temperature delta value, a duty cycle offset that is based on an average of a predetermined number of prior switching ratios, and a heat dissipation offset that is based on the average of a predetermined number of prior switching ratios.

Specifically, the second embodiment of a method first determines a temperature delta value indicative of the difference between the sensed temperature and a desired set point temperature at step 302. At step 310, the method then determines a duty cycle based on the temperature delta value, which duty cycle is used in determining a percentage of a finite switching period in which a switch is activated. At step 320, the method then determines the average of a number of prior switching ratios (or firing rates as calculated using the look-up table percentages, where prior calculated switching ratios exist). If there is not a sufficient number of prior calculated percentages, a default value is used in place of the determined average. The method then determines at steps 330 and 340 both a duty cycle offset value and a heat dissipation offset value, which are based on the average of a number of prior switching ratios. From the preceding values determined in the above steps, the method proceeds at step 350 to calculate a firing rate or percentage of a finite switching time period in which a switch is to be activated based on the temperature delta value, the duty cycle offset value, and a heat dissipation offset value (which is a function of or based on the average of prior calculated switching percentages). Once the method has calculated a percentage of the finite time period in which to activate the switch, the method then calls for activating the switch for the determined percentage of the switching time period at step 360. The activation of the switch for only a percentage of a total switching time period limits the extent of electrical power that is applied to a heating element or load, to thereby control the amount of heat that is being generated by the heating element or load. Using the above method for determining and adjusting the percentage of time in which a switch is activated to apply power to a heating element, a thermostat is capable of more effectively controlling the heat source to more accurately control the temperature within the space being heated. From the above, the processor is configured to activate the switch for the calculated ratio of the total switching period, to thereby control the extent of electrical power applied to the heating element.

Accordingly, the above embodiments of a thermostat apparatus and method for controlling thermostat operation using a single temperature sensing element within the thermostat provide for operating the thermostat to maintain a tight differential temperature of 2 degrees, which avoids temperature overshoot and promotes energy savings. This benefit is the advantage provided by the above controller and algorithm, which is needed for thermostats that control line voltage heating loads.

It will be understood by those skilled in the art that the temperature compensation algorithms disclosed in the above embodiments may be employed in any thermostat that is used or designed to control a cooling load or a heating load. Accordingly, it should be understood that the disclosed embodiments, and variations thereof, may be employed in any apparatus utilizing a switching device for controlling one or more heating loads.

What is claimed is:

1. A thermostat for controlling the application of electrical power to a heating element for controlling the ambient temperature within a space, the thermostat comprising:
    a housing having an interior space;
    a temperature sensor disposed within the interior space of the housing and configured to sense an ambient temperature;
    a switch disposed within the interior space of the housing and configured to apply electrical power to a heating element when the switch is activated;
    a heat sink associated with the switch and disposed within the interior space of the housing, the heat sink configured to dissipate heat generated by the switch; and
    a processor configured to determine a temperature delta value indicative of the difference between the sensed ambient temperature and a desired set point temperature, to calculate a heat dissipation offset based on an average of a predetermined number of prior calculated percentages of a finite switching time period, the heat dissipation offset associated with heat generated by the switch, and to calculate a percentage of the finite switching time period for activating the switch based on the temperature delta value and the heat dissipation offset;
    wherein the processor is configured to activate the switch for the calculated percentage of the finite switching time period, to thereby control the extent of electrical power applied to the heating element.

2. The thermostat of claim 1 wherein the switch is configured to switch a line voltage source to the heating element, said switch being disposed within the interior space of the housing such that heat generated by said switch is dissipated within the interior space and affects the temperature sensor disposed within the housing.

3. The thermostat of claim 1 wherein the processor is further configured to calculate a duty cycle offset based on the average of the predetermined number of prior calculated percentages, said processor being configured to calculate the percentage of the finite switching time period based on the temperature delta value, the heat dissipation offset, and the duty cycle offset.

4. The thermostat of claim 1 wherein the heat sink associated with said switch is disposed within the interior space of the housing at a location distanced from the temperature sensor, such that heat generated by said switch is dissipated away from the temperature sensor within the housing.

5. The thermostat of claim 1 wherein the housing defines at least one lower vent opening and at least one upper vent opening, and wherein the heat sink is disposed within the housing such that heat dissipated by the heat sink causes an updraft airflow between the at least one lower vent opening and the at least one upper vent opening.

6. The thermostat of claim 1 wherein the processor is configured to determine the heat dissipation offset based on a default value where there is less than the predetermined number of prior calculated percentages of the finite switching time period.

7. A thermostat for controlling the application of electrical power to a heating element for controlling the ambient temperature within a space, the thermostat comprising:
    a housing defining an interior space;
    a temperature sensor disposed within the interior space of the housing and configured to sense an ambient temperature of the interior space;
    a switch disposed within the interior space of the housing, configured to apply electrical power to a heating element when the switch is activated;
    a heat sink associated with the switch and disposed within the interior space of the housing and the heat sink configured to dissipate heat generated by the switch; and
    a processor configured to determine, for a finite switching time period, a temperature delta value indicative of the difference between the sensed ambient temperature and a desired set point temperature, to calculate a heat dissipation offset as a function of an average of a predetermined number of prior percentages of the finite switching time period, the heat dissipation indicative of the heat dissipated by the heat sink within the housing, and to determine a percentage of the switching time period that the switch is activated, based on the temperature delta value and the heat dissipation offset, said processor configured to activate the switch for the determined percentage of the switching time period, to thereby control the extent of electrical power applied to the heating element, wherein the heat dissipation offset value varies proportionally with respect to the averaged of the prior switching percentages.

8. The thermostat of claim 7 wherein the switch is configured to switch a line voltage source to the heating element, said switch being disposed within the interior space of the housing such that heat generated by said switch is dissipated within the interior space of the housing and affects the temperature sensor disposed within the housing.

9. The thermostat of claim 7 wherein the processor is further configured to calculate a duty cycle offset that is determined based on an average of a predetermined number of prior switching percentages, said processor being configured to calculate the switching percentage based on the temperature delta value, the heat dissipation offset, and the duty cycle offset.

10. The thermostat of claim 7 wherein the heat sink is spaced apart from the temperature sensor.

11. The thermostat of claim 7 wherein the housing defines at least one lower vent opening and at least one upper vent opening, and wherein the heat sink is disposed within the housing such that heat dissipated by the heat sink causes an updraft airflow between the at least one lower vent opening and the at least one upper vent opening.

12. The thermostat of claim 7 wherein the processor is configured to determine a heat dissipation offset based on a default value where there is less than the predetermined number of prior calculated percentages of the finite switching time period.

13. A thermostat for controlling the application of electrical power to a heating element for controlling the ambient temperature within a space, the thermostat comprising:
    a housing defining an interior space;
    a temperature sensor disposed within the interior space of the housing and configured to sense an ambient temperature;

a switch disposed within the interior space of the housing and configured to apply electrical power to a heating element when the switch is activated;

a heat sink associated with the switch and disposed within the interior space of the housing, which is configured to dissipate heat generated by the switch; and a processor, configured to periodically determine, for a finite switching time period, a temperature delta value indicative of the difference between the sensed ambient temperature and a desired set point temperature, the processor configured to determine a duty cycle offset based on an average of a predetermined number of prior switching ratios, and to determine a heat dissipation offset based on the average of the predetermined number of prior switching ratios, the heat dissipation offset being associated with heat generated by activation of the switch, wherein said processor is configured to calculate a ratio of a switch activation time to the finite switching time period as a function of: the temperature delta value, the duty cycle offset, and the heat dissipation offset;

wherein said processor is configured to activate the switch for the calculated ratio, to thereby control the extent of electrical power applied to the heating element.

14. The thermostat of claim 13 wherein the switch is configured to switch a line voltage source to a heating element, said switch being disposed within the interior space of the housing such that heat generated by said switch is dissipated within the interior space and affects the ambient temperature sensed by the temperature sensor disposed within the housing.

15. The thermostat of claim 14 wherein the heat sink associated with said switch is disposed within the interior space of the housing at a location distanced from the temperature sensor.

16. The thermostat of claim 15 wherein the housing defines at least one lower vent and at least one upper vent opening, wherein the heat sink is disposed within the housing such that heat dissipated by the heat sink causes an updraft airflow between the at least one lower vent opening and the at least one upper vent opening, thereby exhausting heat from the interior space of the housing.

17. The thermostat of claim 13 wherein the processor is configured to determine the heat dissipation offset and the duty cycle offset based on a default value where there is less than the predetermined number of prior switching ratios.

18. The thermostat of claim 1 wherein the temperature delta value is determined periodically, and the heat dissipation offset is calculated periodically.

19. The thermostat of claim 1 wherein the processor is further configured to calculate a duty cycle offset based on multiple prior calculated percentages of the finite switching time period, and wherein the processor is configured to calculate the percentage of the finite switching time period based on the temperature delta value, the heat dissipation offset, and the duty cycle offset.

* * * * *